US011469943B2

(12) United States Patent
Bregman et al.

(10) Patent No.: US 11,469,943 B2
(45) Date of Patent: Oct. 11, 2022

(54) PRE-SCHEDULING FOR CLOUD RESOURCE PROVISIONING

(71) Applicant: RED HAT, INC., Raleigh, NC (US)

(72) Inventors: Arie Bregman, Gan Yavne (IL); Nir Magnezi, Petah Tikva (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/706,191

(22) Filed: Dec. 6, 2019

(65) Prior Publication Data
US 2021/0176122 A1 Jun. 10, 2021

(51) Int. Cl.
*H04L 41/0806* (2022.01)
*H04L 67/10* (2022.01)
*H04L 47/70* (2022.01)
*G06F 9/50* (2006.01)
*H04L 41/50* (2022.01)
*H04W 24/04* (2009.01)

(52) U.S. Cl.
CPC ............ *H04L 41/0806* (2013.01); *G06F 9/50* (2013.01); *G06F 9/5044* (2013.01); *G06F 9/5077* (2013.01); *H04L 41/50* (2013.01); *H04L 47/827* (2013.01); *H04L 67/10* (2013.01); *H04W 24/04* (2013.01)

(58) Field of Classification Search
CPC ... H04L 41/0806; H04L 41/50; H04L 47/827; H04L 67/10; G06F 9/5044; G06F 9/5077; G06F 9/50; H04W 24/04
See application file for complete search history.

(56) References Cited

U.S. PATENT DOCUMENTS

| 8,396,014 | B2* | 3/2013 | Sharaga | H04W 52/0274 |
| | | | | 370/310 |
| 8,949,976 | B2* | 2/2015 | Grupe | G06F 21/562 |
| | | | | 726/22 |
| 9,525,643 | B2 | 12/2016 | Teather et al. | |
| 10,025,684 | B2* | 7/2018 | Khoury | G06F 9/5011 |
| 10,405,146 | B1* | 9/2019 | Kuruvilla | H04W 4/021 |

(Continued)

FOREIGN PATENT DOCUMENTS

| CN | 107404523 A | 11/2017 |
| CN | 109947532 A | 6/2019 |

OTHER PUBLICATIONS

Red Hat, Inc. (2019). "Architecture Guide—Introduction to the Product, Components, and Architectural Examples". 90 pages.

(Continued)

*Primary Examiner* — Michael A Keller
(74) *Attorney, Agent, or Firm* — Lowenstein Sandler LLP

(57) ABSTRACT

Implementations for estimating the likelihood of successful execution of a request to create a set of computing resources in a cloud computing environment are described. An example method may include receiving, by a processing device, a request to provision a set of computing resources of a cloud computing environment, translating the request into a set of hardware specifications, determining whether the set of hardware specifications is within a quota associated with an initiator of the request, determining whether the cloud computing environment has sufficient available computing resources matching the set of the hardware specifications, and notifying the initiator of the request of the availability of the computing resources specified by the request.

24 Claims, 6 Drawing Sheets

(56) References Cited

U.S. PATENT DOCUMENTS

| | | | | |
|---|---|---|---|---|
| 2003/0044185 | A1* | 3/2003 | Kawaura | H04N 1/00938 399/77 |
| 2003/0218765 | A1* | 11/2003 | Ohishi | G06F 9/4843 358/1.15 |
| 2005/0038918 | A1* | 2/2005 | Hilland | G06F 15/17375 710/1 |
| 2008/0300908 | A1* | 12/2008 | Hunter | H04M 1/72563 705/1.1 |
| 2012/0300249 | A1* | 11/2012 | Shustef | G06F 3/1287 358/1.15 |
| 2013/0097275 | A1* | 4/2013 | Wofford, IV | G06F 16/25 709/213 |
| 2013/0212576 | A1* | 8/2013 | Huang | G06F 9/5072 718/1 |
| 2014/0282528 | A1* | 9/2014 | Bugenhagen | G06F 11/3433 718/1 |
| 2015/0106512 | A1* | 4/2015 | Cama | H04L 43/08 709/224 |
| 2015/0271092 | A1* | 9/2015 | Ward, Jr. | H04L 67/10 709/226 |
| 2016/0306751 | A1* | 10/2016 | Amarendran | G06N 20/00 |
| 2016/0380906 | A1 | 12/2016 | Hodique et al. | |
| 2017/0031622 | A1* | 2/2017 | Nagarajan | G06F 3/0607 |
| 2017/0257525 | A1* | 9/2017 | Noda | H04N 1/4413 |
| 2018/0011998 | A1* | 1/2018 | Okamura | G06F 3/04847 |
| 2018/0145989 | A1* | 5/2018 | Das | G06F 9/5088 |
| 2018/0198818 | A1* | 7/2018 | Andrews | H04L 67/12 |
| 2018/0198855 | A1 | 7/2018 | Wang | |
| 2018/0324132 | A1* | 11/2018 | Barnard | H04L 51/24 |
| 2018/0365072 | A1 | 12/2018 | Li et al. | |
| 2020/0379660 | A1* | 12/2020 | Ciudad | G06F 3/0632 |

OTHER PUBLICATIONS

V, Vignesh et al. (Jun. 20130 "Resource Management and Scheduling in Cloud Environment" School of Computing Science and Engineering, VIT University Vellore, Tamil, Nadu, India, 6 pages.

* cited by examiner

PRE-SCHEDULING FOR CLOUD RESOURCE PROVISIONING

TECHNICAL FIELD

The disclosure is generally related to cloud computing systems, and more particularly, to estimating and aggregating resource usage prior to provisioning a set of resources in a cloud computing environment.

BACKGROUND

Cloud computing is generally becoming the platform of choice for businesses that want to reduce operating expenses and be able to scale resources rapidly. Eased automation, flexibility, mobility, resiliency, and redundancy are several of the advantages of moving resources to the cloud. Many organizations are being introduced to cloud computing by building an Infrastructure-as-a-Service (IaaS) cloud, which delivers computing, storage, and networking resources to users. A resource or set of resources may be initialized in the IaaS cloud using templates.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
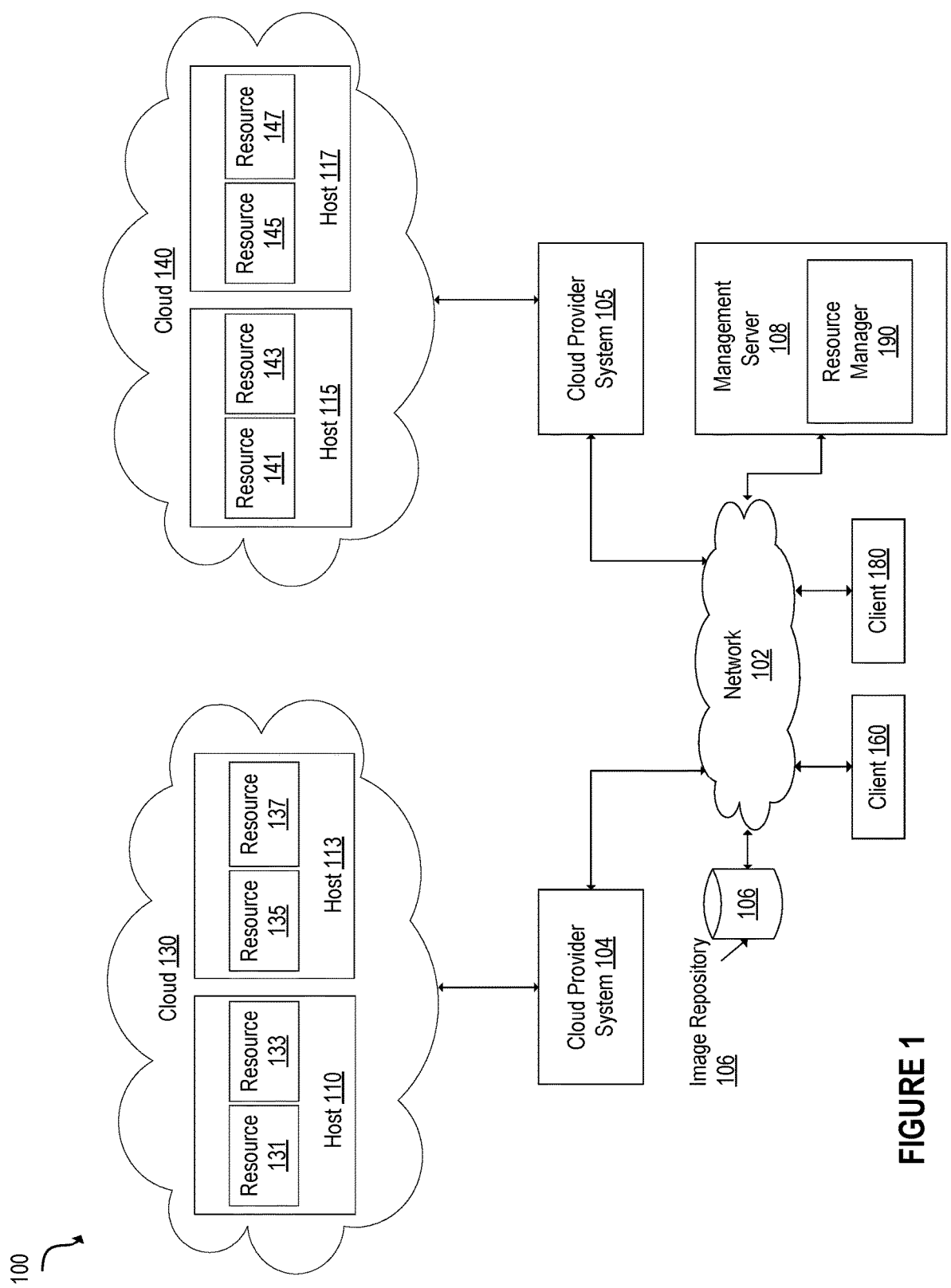
FIG. 1 depicts a high-level block diagram of an example computer system architecture, in accordance with one or more aspects of the disclosure.

Described herein are systems and methods for providing cloud operators and/or users with an estimation of the likelihood of successful execution of a request to create a set of computing resources in a cloud computing environment. The cloud computing environment is a collection of computing resources that delivers computing services to users over a network. In the following disclosure, computing resources refer to, among other things, virtual machine instances, including virtual central processing units (vCPUs), memory, disk space, and/or virtual networks. A management server may manage the deployment of computing resources in the cloud computing environment. The management server may receive a request to provision a set of computing resources in a cloud computing environment. The computing resources specified by the provisioning request may include compute resources, network configuration, and other custom resources. The computing resources may be provisioned to provide a particular functionality in the cloud computing environment.

In some implementations of cloud computing environments, there is no guarantee that a requested set of computing resources will be created successfully. For example, some implementations of cloud computing environments may fail to allocate the resources specified by the request due to quota limits and/or lack of available hardware resources on the host systems. The requestor may have to wait a long time before learning that the request has failed. Additionally, at least some of the provisioning operations may succeed before the request fails, thus necessitating roll back operations to be performed.

Aspects of the disclosure address the above-noted and other deficiencies by providing systems and methods that estimate the likelihood of successful execution of a request to create a set of computing resources in a cloud computing environment. In implementations of the disclosure, a resource manager of the management server may receive a request to provision a set of computing resources of a cloud computing environment. The resource manager may translate the request into a set of hardware specifications, which may involve matching the request to one or more templates in order to identify the specific computing resources requested and determine the hardware specifications required to support the identified computing resources. The resource manager may identify parameters of the memory, disk space, central processing units, and/or networks that will be consumed once the request is executed.

Responsive to receiving and parsing the resource provisioning request, the resource manager may query the cloud computing environment to determine the requestor's available quota. The resource manager may then compare the requestor's available quota to the previously identified hardware specifications to determine whether the requested computing resources are within the requestor's quota.

Next, the resource manager may determine whether the cloud computing environment has sufficient computing resources available to fulfill the provisioning request. The resource manager may inspect one or more hosts in the cloud computing environment to determine the hosts' available computing resources, and then aggregate the hosts' available computing resources to determine the available computing resources in the cloud as a whole. The resource manager may compare the available computing resources to the previously identified hardware specifications necessary to support the provisioning request. The resource manager may then notify the requestor of the outcome of these comparisons.

More specifically, if the resource manager determines that the cloud computing environment has sufficient available computing resources to support the request, and the request is within the requestor's quota, then the resource manager may notify the initiator of the request that the request may be executed. If the requestor then instructs the resource manager to execute the request, the resource manager may confirm that the cloud computing environment resource usage has not changed since the resource manager last determined that the cloud computing environment had sufficient available computing resources to support the request. That is, since resource usage in cloud computing environments may change rapidly, the resource manager may verify that the cloud computing environment still has sufficient computing resources to support the request just before executing the request. If the resource manager determines that the cloud computing environment no longer has sufficient computing resources to support the request, the resource manager may notify the requestor of such outcome. The requestor may then modify the request and attempt to execute the modified request. On the other hand, if the resource manager determines that the cloud computing environment may still support the provisioning request, the resource manager may execute the request.

The systems and methods described herein include technology that enhances utilization of computing resources, such as processor usage and memory usage, for a computer system. In particular, aspects of the disclosure provide technology that enhances the efficiency and/or performance of a computing system by reducing the failure rate of computing resource provisioning operations.

Various aspects of the above referenced methods and systems are described in details herein below by way of examples, rather than by way of limitation.

FIG. 1 is a block diagram of a network architecture 100 for a distributed computing system, in which embodiments of the invention may operate. The network architecture 100 may include multiple clouds (networks of computing resources) 130, 140 managed by various cloud provider systems 104, 105. There may be any number of clouds 130, 140 and cloud provider systems 104, 105. For brevity and simplicity, two clouds 130, 140 are used as an example throughout this document. In an embodiment, the network architecture includes clouds from multiple cloud providers, and multiple clouds may be provided by a single cloud provider. The clouds 130, 140 provide resources 131-137, 141-147. There may be any number of resources 131-137, 141-147 in a cloud 130, 140. For brevity and simplicity, four resources 131-137, 141-147 in each cloud 130, 140 are used as an example in architecture 100. For example, cloud 130 provides resources 131, 133, 135, and 137, and cloud 140 provides resources 141, 143, 145, and 147.

Resources 131-137, 141-147, as discussed herein, may refer to a computing resource, such as virtual machine instances, disk storage, memory, vCPUs, or networks, for example. Each resource 131-137, 141-147 is hosted or enabled on a physical machine configured as part of the cloud 130, 140. Such physical machines are often located in a data center. For example, resources 131 and 133 are hosted on host 110 in cloud 130 provided by cloud provider system 104, resources 135 and 137 are hosted on host 113 in cloud 130 provided by cloud provider system 104, resources 141 and 143 are hosted on host 115 in cloud 140 provided by cloud provider system 105, and resources 145 and 147 are hosted on host 117 in cloud 140 provided by cloud provider system 105.

The cloud provider systems 104, 105 and clouds 130, 140 may be provided as an infrastructure as a service (IaaS) layer. The cloud provider systems 104, 105 and clouds 130, 140 may be provided by, for example, a third party cloud provider or an organization including consumers of cloud 130, 140. For example, cloud provider system 104 and cloud 130 may be provided by Cloud-Provider-1, and cloud provider system 105 and cloud 140 may be provided by Cloud-Provider-2. A cloud provider may provide more than one type of cloud provider system 104, 105 and more than one type of cloud 130, 140. The cloud provider may be an entity. An entity, as referred to here, may represent any person, a business organization such as a corporation, an educational institution such as a college or university, etc. Users may interact with applications executing on cloud-based virtual machines using client computer systems, such as clients 160, 180. Users may have one or more accounts associated with a cloud provider system 104, 105.

Clients 160, 180 are connected to hosts 110, 113, 115, 117 and cloud provider systems 104, 105 via a network 102, which may be may be a private network (e.g., a local area network (LAN), a wide area network (WAN), intranet, or other similar private networks) or a public network (e.g., the Internet). Each client 160, 180 may be a mobile device, a PDA, a laptop, a desktop computer, or any other computing device. Each host 110, 113, 115, 117 may be a server computer system, a desktop computer or any other computing device. The cloud provider system 104, 105 may include one or more machines such as server computers, desktop computers, etc.

In one embodiment, the cloud provider system 104, 105 is coupled to a management server 108 via the network 102. The management server 108 may include a resource manager 190, which may reside on the same machine or different machines (e.g., server computers, desktop computers, etc.). The management server 108 may be maintained by a cloud consumer of cloud 130, 140 such as an enterprise (e.g., business, company, organization, etc.). In another embodiment, the management server 108 may be maintained by a third party cloud provider. In yet another embodiment, the management server 108 may be part of the cloud provider system 104, 105.

The management server 108 may manage the deployment of resources 131-137, 141-147 in the cloud 130, 140. The management server 108 may receive a request, for example, from a system administrator via a client 160, 180, describing a set of resources 131, 133, 135, 137, 141, 143, 145, 147 to be deployed in the cloud 130, 140. In one implementation, the deployment of the resources 131-137, 141-147 enables the execution of one or more applications via the cloud 130, 140. An image repository 106 may be populated with resource deployment data to be used to deploy the resources 131-137, 141-147.

The resource deployment data may be described in a structured format that specifies hardware profiles of the resources including an amount of memory, a number of virtual CPUs, an amount of disk space available, as well as networks available. The resource deployment data may be parsed and executed to cause the associated resource 131-137, 141-147 to be deployed in the cloud 130, 140.

In one embodiment, the management server 108 may generate the resource deployment data based on the provisioning request and may store the resource deployment data in the image repository 106. The repository 106 may reside locally or remotely, and may represent a single data structure or multiple data structures (databases, repositories, files, etc.) residing on one or more mass storage devices, such as magnetic or optical storage based disks, solid-state drives (SSDs) or hard drives. The provisioning request may define the requested resource type, properties, and conditions, for example. The provisioning request may be received via a resource provisioning application programming interface (API), a graphical user interface (GUI), and/or a command line interface (CLI), for example. The provisioning request may be based on a template, which may refer to a description of a disk image and meta-data for creating a cloud resource 131-137, 141-147. A template may be defined by a text file, a YAML file, an XML file, or other types of files. The template may specify one or more parameters of the instance that is to be deployed (in processor cores, RAM, and disk space). Management server 108 may query the cloud provider system 104, 105 using a cloud API (or another method) to determine the hardware specifications that the specified instance will consume.

Upon receiving a request to provision a set of computing resources 131-137, 141-147, the resource manager 190 may parse the request to identify the disk space, memory, CPUs, network identifiers, and any other resources required to support the provisioning request. Resource manager 190 may then store the identified resources in a memory data structure. The resource manager 190 may further inspect the resources 131-137, 141-147 on one or more hosts in order to determine how much memory, disk space, CPUs and/or network resources are available for use, and may store this information in another memory data structure. The resource manager 190 may compare these data structures to determine whether the cloud computing environment has sufficient computing resources available to support the request, and may notify the requestor of such availability prior to or upon execution of the request. Resource manager 190 is further described below with reference to FIG. 2.

Figure 2:
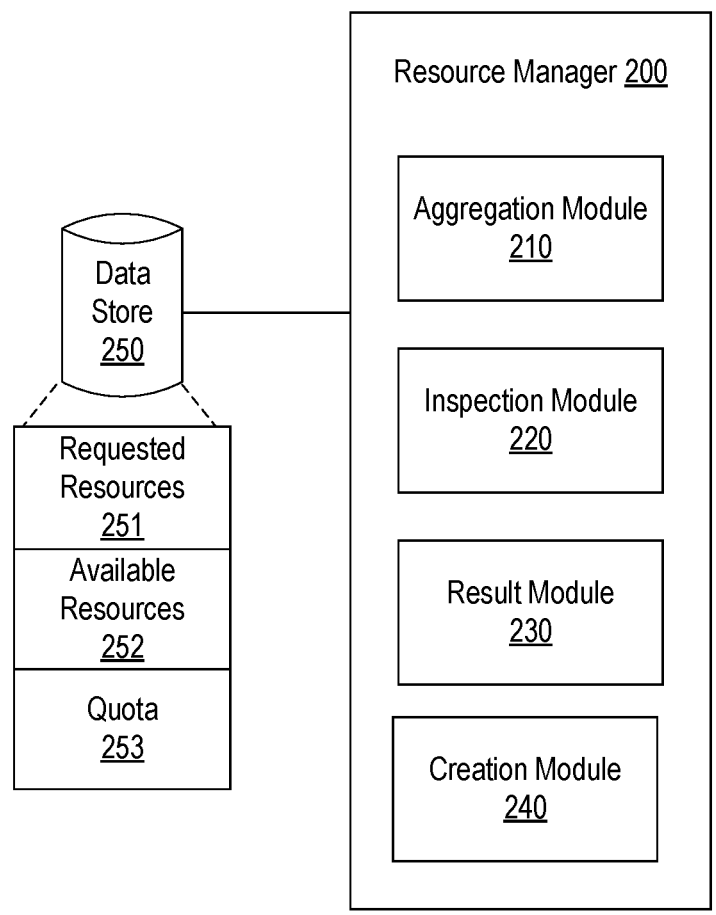
FIG. 2 depicts a block diagram of an example resource manager, according to one or more aspects of the disclosure.

FIG. 2 illustrates a block diagram of one embodiment of resource manager 200 in accordance with implementations of the disclosure. In one embodiment, the resource manager 200 may implement the functions of resource manager 190 of FIG. 1. Resource manager 200 may include an aggregation module 210, an inspection module 220, a result module 230, and a creation module 240. Note that in alternative embodiments, the resource manager 200 may include more or less modules than those shown in FIG. 2. Also, one or more of the aggregation module 210, inspection module 220, result module 230, and/or creation module 240 may be combined into a single module. Additionally, the functionality of any of the aggregation module 210, inspection module 220, result module 230, and/or creation module 240 may be divided between multiple modules.

In one embodiment, the aggregation module 210 may receive the provisioning request and translate the request into a set of hardware specifications. The aggregation module 210 may parse the request in order to determine the resources that will be consumed once the request has been executed. In one embodiment, the provisioning request may be based on a template that defines the computing resources requested, such as compute instances, networks, and storage volumes, by listing the resource type, resource properties, resource dependencies, and resource conditions, for example. In order to translate the request, the aggregation module 210 may parse the provisioning request to identify the resource type. The aggregation module 210 may then determine the hardware specifications needed to support the computing resources identified in the provisioning request. For example, the aggregation module 210 may use an API call to determine that the hardware specifications required to support the resource type from the provisioning request. In one embodiment, the API call may use the resource type as a parameter and return how much CPU, RAM, and disk space will be allocated to support the provisioning request.

The aggregation module 210 may then store the hardware specifications in requested resource data structure 251. Requested resource data structure 251 may be a JSON or YAML data structure. The data structure may include how much memory, disk space, CPUs, and/or networks the request will consume.

Once the aggregation module 210 has determined the hardware specifications required to support the provisioning request, the inspection module 220 may identify the resources available for use in the cloud. The inspection module 220 may inspect one or more hosts, using a cloud application programming interface (API) or another method, to determine the resources available in the cloud computing environment. For example, the management server may use an API call that will return a list of all the hypervisors on each host, and list the amount of free disk space, free RAM, and the number of vCPUs available for each hypervisor. The inspection module 220 may then store the one or more hosts' available resources in available resource data structure 252, for example as a JSON or YAML data structure. The data structure may include how much memory, disk space, CPUs, and networks each host has available. The inspection module 220 may also query the cloud to determine the quota associated with the initiator of the request, and store the quota in quota data structure 253.

In one embodiment, the inspection module 220 may aggregate the available resources from all the hosts based on the type of computing resource requested. More specifically, the inspection module 220 may determine the types of computing resources requested, and aggregate the hosts' available resources specific to supporting the computing resources requested. In other words, the inspection module 220 may match the hardware specifications to the available computing resources and collect the memory, disk space, CPUs, or networks each host has available. This collection may be stored on a per host basis, since the memory, disk space, CPU, and networks of one virtual machine instance cannot be split across multiple hosts.

While the computing resources of one virtual machine instance may not be split across multiple hosts in the cloud, some of the computing resources in the provisioning request as a whole may be split between different hosts. The disk space in the provisioning request may be split between multiple disks within each storage domain. All requisite networks should be available on the host on which the virtual machine is created, however multiple virtual machine instances that are connected to the same network may be created on separate hosts. Furthermore, the requisite memory and vCPUs may not be split between multiple hosts in the cloud computing environment.

In addition to determining the cloud's available resources, the inspection module 220 may also determine the quota specific to the request initiator. The quota may be described as an upper boundary, or an operational limit, on how many computing resources the initiator may utilize at any given time. The quota may not, however, be indicative of the availability of specific resources on the cloud. For example, the quota may limit the request initiator's use to 100 terabytes of RAM while the cloud computing environment may have 32 gigabytes available. The inspection module 220 may query the cloud in order to determine the quota associated with the initiator of the request, and may store the quota in quota data structure 253. The quota may refer to disk space, memory, CPUs, and/or networks, for example.

The result module 230 may then compare the data structures created by the aggregation module 210 and the inspection module 220 in order to determine whether the cloud computing environment has available computing resources matching the requested hardware specification. If it does, the result module 230 may notify the initiator of the request of availability of the requested computing resources.

More specifically, the result module 230 may compare the requested resource data structure 251 with the quota stored in the quota data structure 253. If the data stored in the requested resource data structure 251 are all within the quota stored in the quota data structure 253, the result module 230 may then continue comparing the available resources to the requested resources. If at least one of the requested resources stored in requested resource data structure 251 is over the quota, the results module 230 may notify the initiator of the request that the request will fail due to exceeding the quota.

Responsive to determining that the requested resources are within the quota, the result module 230 may then determine whether the cloud computing environment has sufficient computing resources available to support the provisioning request. The result module 230 may compare the requested resource data stored in requested resource data structure 251 to the available resources data stored in available resource data structure 252. In one embodiment, the result module 230 may deduct the requested resources from the available resources in order to determine whether the cloud may support execution of the provisioning request. The result module 230 may compare the storage required to support execution of the request to the storage available in the cloud, for example, by deducting the storage required to support execution of the request from the storage available. The result module 230 may further compare the vCPUs and memory requested to the vCPUs to memory available per host in the cloud, for example, to determine whether the cloud may support the provisioning request. The result module 230 may also compare the networking requirements requested in the provisioning request to the networks available for use in the cloud.

In one embodiment, the creation module 240 may automatically execute the provisioning request once result module 230 has determined that the cloud has sufficient computing resources available to support the provisioning request and that the provisioning request is within the quota.

In another embodiment, the creation module 240 may await the requestor's instructions before executing the provisioning request. That is, once the result module 230 has notified the requestor that the cloud has sufficient computing resources available to support the provisioning request and that the request is within the quota, the requestor may send the instructions to execute the provisioning request. Upon receiving such instructions, the creation module 240 may query the inspection module 220 to determine whether the cloud computing environment has changed since the hosts were last inspected. Prior to executing the request, the inspection module 220 may once again query each host, using the above described techniques, to determine whether the available resources have changed. In one embodiment, the inspection module 220 may compare the resource identifiers stored in available resource data structure 252 to the results returned from the new query from each host. If the resources available in the cloud computing environment have not changed, the creation module 240 may execute the request. If the inspection module 220 determines that the resources available in the cloud computing environment have changed, the inspection module 220 may update the available resource data structure 252, and the result module 230 may perform another comparison between the available resource data structure 252 and the requested resource data structure 251. Upon determining that the cloud computing environment has sufficient resources to support the provisioning request, the creation module 240 may then execute the request. However, if the result module 230 determines that the cloud computing environment no longer has sufficient resources to support the request, the results module 230 may notify the requestor that the provisioning request will not be successful. The requestor may then modify the request and try again.

In one embodiment, the result module 230 may only re-check the quota if a sufficient amount of time has passed between sending the notification to the requestor and receiving the requestor's instructions to execute the request. That is, since the quota may change infrequently, it may not be necessary to re-check whether the requested resources are within the quota if only a short amount of time has passed since the last check. For example, the quota may only change once per day, once per month, or once per year, in which case the inspection module 220 may only verify that the quota has not changed if the requestor's instructions to execute the request was received a set number of hours, days, or months after the notification that the cloud has sufficient resources available to support the request was sent.

Figure 3:
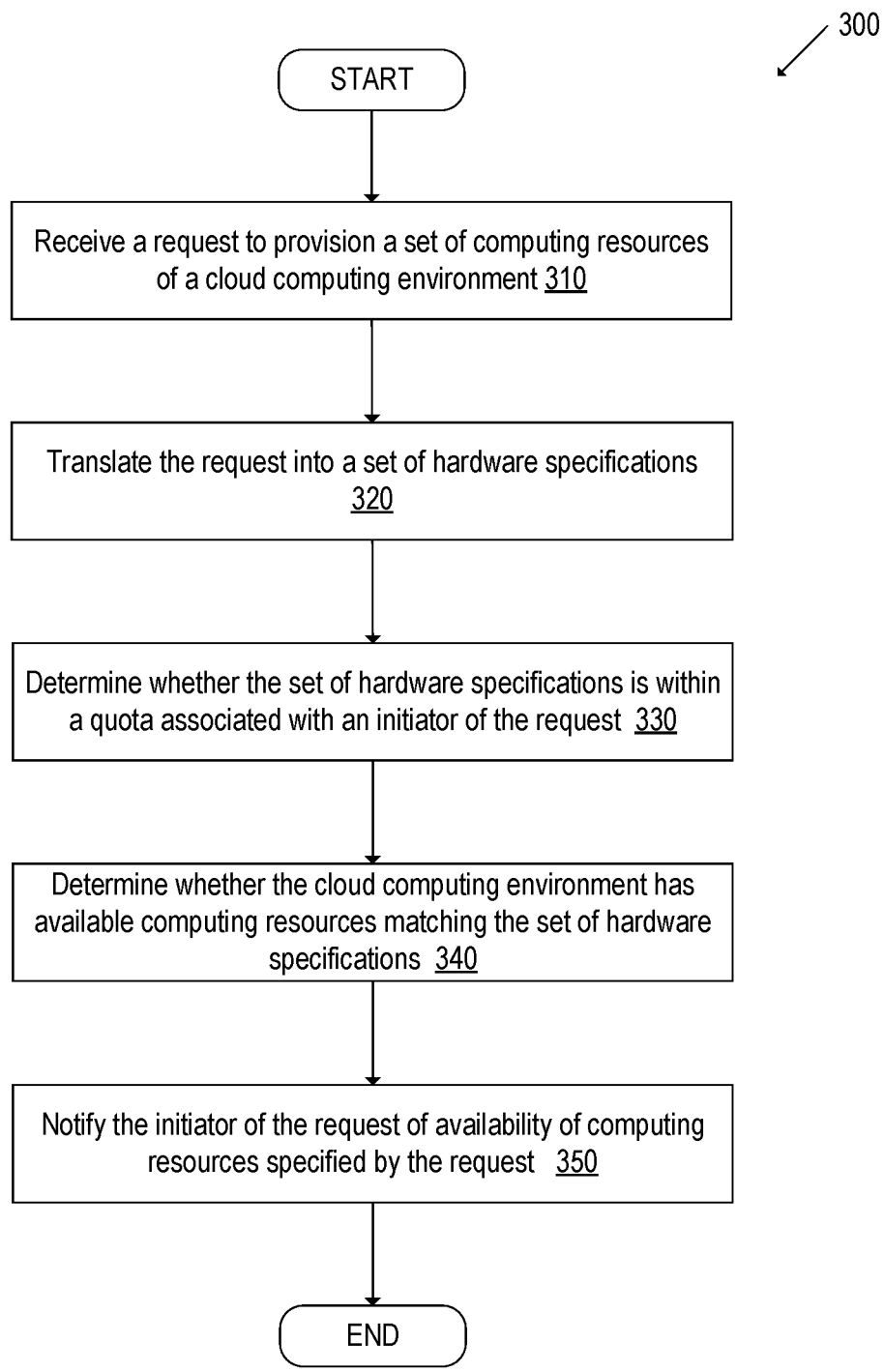
FIG. 3 depicts a process flow diagram of an example method for generating the data structures of requested and aggregated available resources to estimate the likelihood of successful execution of the provisioning request, in accordance with one or more aspects of the disclosure.
Figure 4:
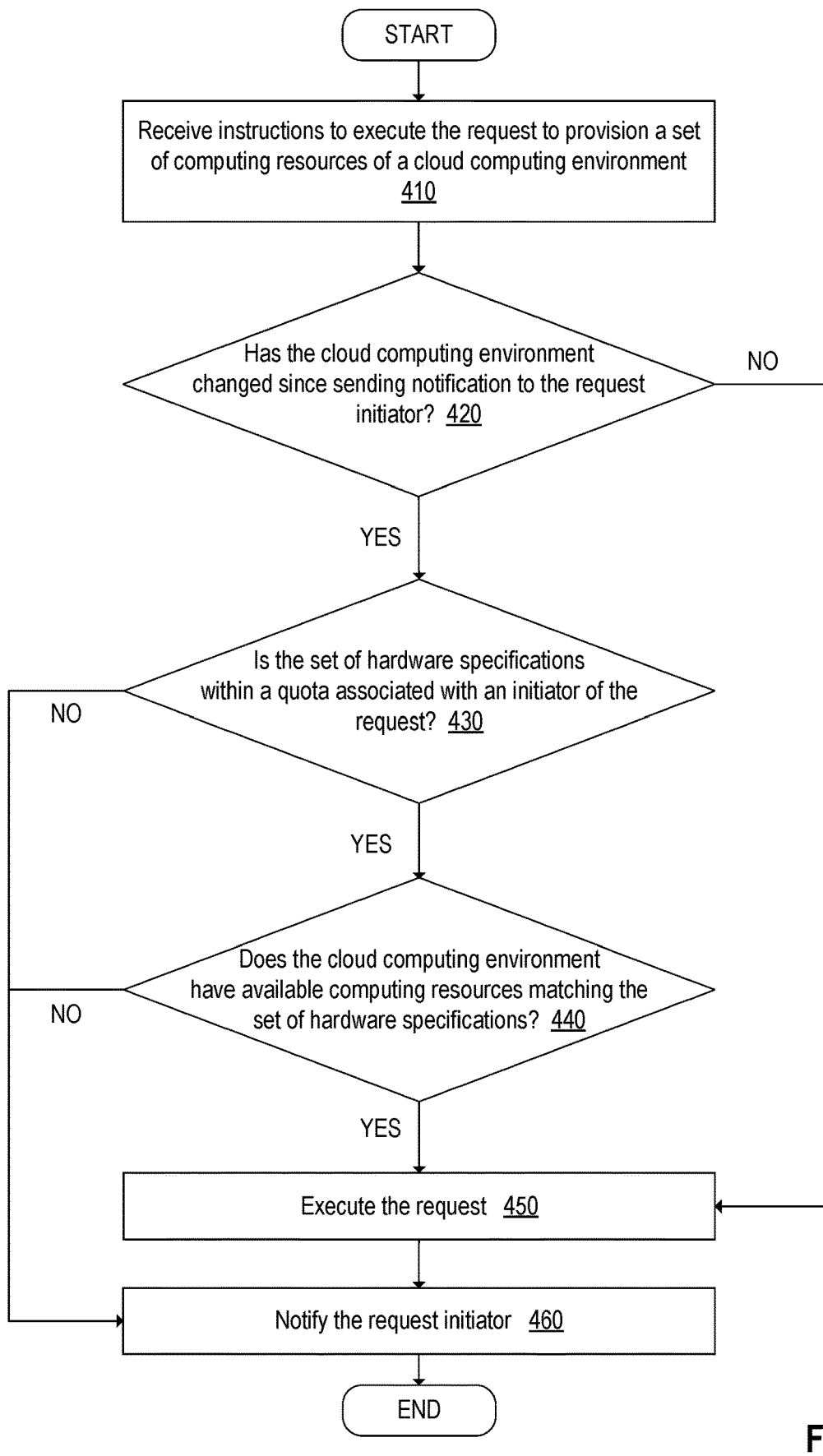
FIG. 4 depicts a process flow diagram of an example method for executing the request to provision a set of computing resources in the cloud computing environment, in accordance with one or more aspects of the disclosure.

FIGS. 3 and 4 depict flow diagrams for illustrative examples of methods 300 and 400 for estimating the likelihood of successful execution of a request to create a set of computing resources in a cloud computing environment, in accordance with one or more aspects of the disclosure. Method 300 illustrates an example process flow for generating the data structures of requested and aggregated available resources to estimate the likelihood of successful execution of the provisioning request, according to at least one implementation. Method 400 is an example process flow for executing the request to provision a set of computing resources in the cloud computing environment, according to at least one implementation.

Methods 300 and 400 may be performed by processing devices that may comprise hardware (e.g., circuitry, dedicated logic, programmable logic, microcode, etc.), executable code (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 300 and 400 may be performed by resource manager 190 as shown in FIG. 1.

Referring to FIG. 3, method 300 may be performed by processing devices of a server device or a client device and may begin at block 310. At block 310, a processing device may receive a request to provision a set of computing resources of a cloud computing environment. In one implementation, the set of computing resources may include one or more instances of a virtual machine, including vCPUs, memory, disk space, and/or network connections, for example. The provisioning request may be based on a template.

At block 320, the processing device may translate the provisioning request into a set of hardware specifications. In one implementation, the processing device may parse the provisioning request to identify the disk space, memory, CPUs, network identifiers, and any other resources required to support the request. Then, at block 330, the processing device may determine whether the set of hardware specifications is within a quota associated with the initiator of the request. At block 340, the processing device may then determine whether the cloud computing environment has available computing resources matching the set of hardware specifications. Lastly, at block 350, the processing device may notify the initiator of the request of the availability of the requested computing resources.

Referring to FIG. 4, method 400 may be performed by processing devices of a server device or a client device and may begin at block 410. At block 410, a processing device may receive instructions to execute the request to provision a set of computing resources of a cloud computing environment. In one implementation, the instructions to execute the request may come from the initiator of the request. In another implementation, the instructions to execute the request may come automatically after determining that the cloud computing environment has sufficient available resources to support the request and that the requested resources are within the initiator's quota.

Subsequently, at decision block 420, the processing device may determine whether the cloud computing environment resource usage has changed since the processing device notified the requestor of the availability of the computing resources. If the cloud computing environment has not changed, the method skips to block 450 and the processing device may execute the provisioning request by deploying the computing resources requested. If, at block 420, the processing device determines that the cloud computing environment has changed, i.e., that the resources currently available do not match those determined before notifying the initiator of the availability of the computing resources, then the method moves on to block 430. At block 430, the processing device may determine whether the set of hardware specifications is within a quota associated with the initiator of the request. If not, the method skips to block 460 and the processing device may notify the request initiator. If the processing device determines that the set of hardware specifications is within the initiator's quota, the method continues to block 440. At block 440, the processing device may determine whether the cloud computing environment has available computing resources matching the set of hardware specifications. If so, then the method may move on to block 450 and the processing device may execute the request. If, at block 440, the processing device determined that the cloud no longer has sufficient resources to support execution of the provisioning request, then the processing device may not execute the request and instead may move to block 460. At block 460, the processing device may notify the requestor of the outcome.

Figure 5:
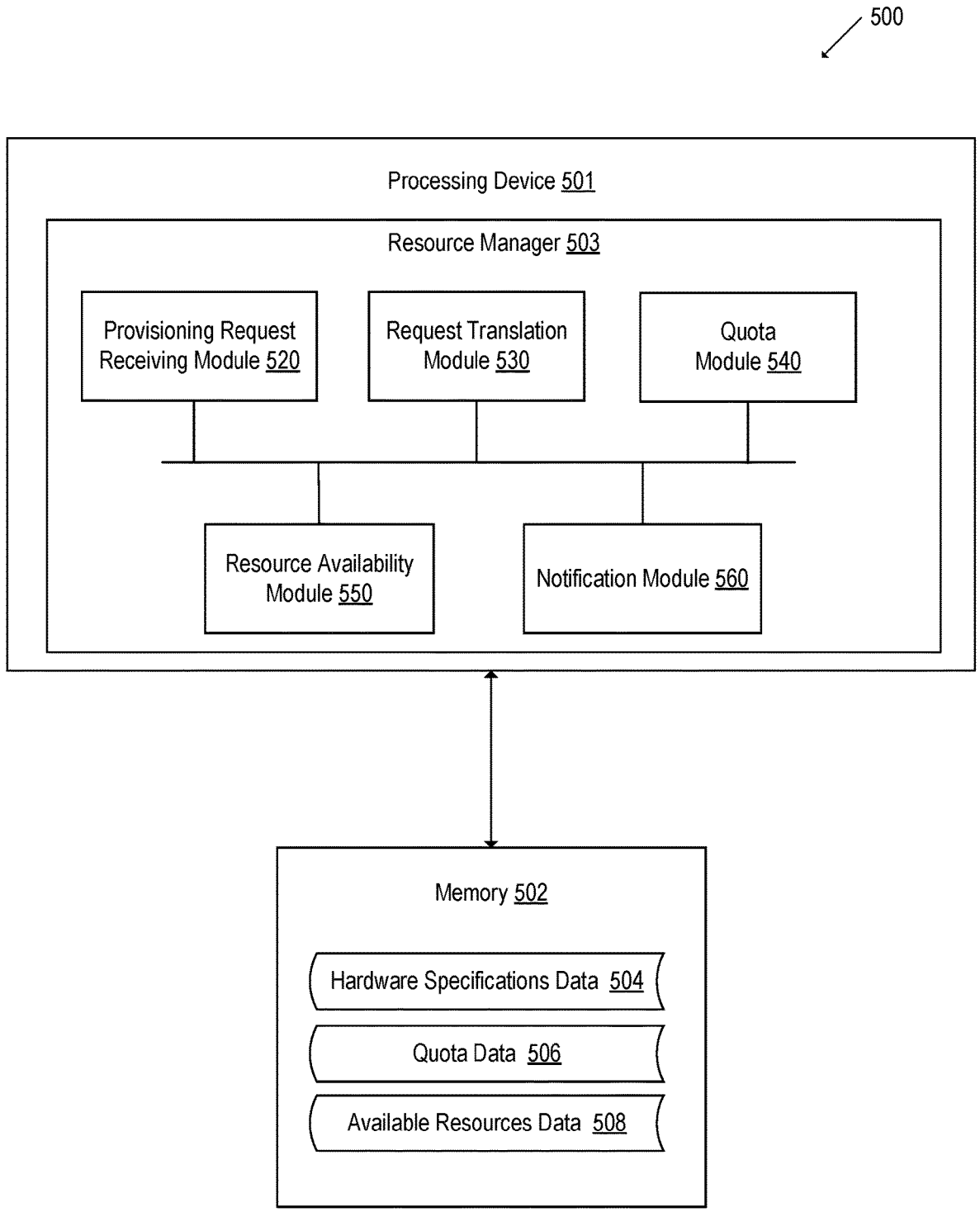
FIG. 5 depicts a block diagram of an example computer system in accordance with one or more aspects of the disclosure.

FIG. 5 depicts a block diagram of a computer system 500 operating in accordance with one or more aspects of the present disclosure. Computer system 500 may perform the same functions as management server 108 of FIG. 1, and may include one or more processing devices 501 and one or more memory devices 502. In the example shown, the processing device 501 of computer system 500 may include a resource manager 503. Resource manager 503 may perform the same functions as resource manager 190 described with respect to FIG. 1.

Resource manager 503 may include a provisioning request receiving module 520, a request translation module 530, a quota module 540, a resource availability module 550, and a notification module 560. The provisioning request receiving module 520 may enable the processing device 501 to receive a request to provision a set of computing resources in a cloud computing environment. The request translation module 530 may enable the processing device 501 to translate the provisioning request into a set of hardware specifications. In one embodiment, the processing device may include the translated provisioning request in hardware specifications data 504.

The quota module 540 may enable the processing device 501 to determine the requestor's available quota for inclusion in quota data 506. The quota module 540 may further enable the processing device 501 to determine whether the hardware specifications are within the request initiator's quota by comparing the hardware specifications data 504 to the quota data 506.

The resource availability module 550 may enable the processing device 501 to determine the available computing resources in the cloud computing environment, and store the data in available resources data 508. The resource availability module 550 may further enable the processing device 501 to determine whether the hardware specifications match the available computing resources in the cloud computing environment by comparing the hardware specifications data 504 to the available resources data 508. The notification module 560 may enable the processing device 501 to notify the requestor of the availability of the computing resources specified by the request.

Figure 6:
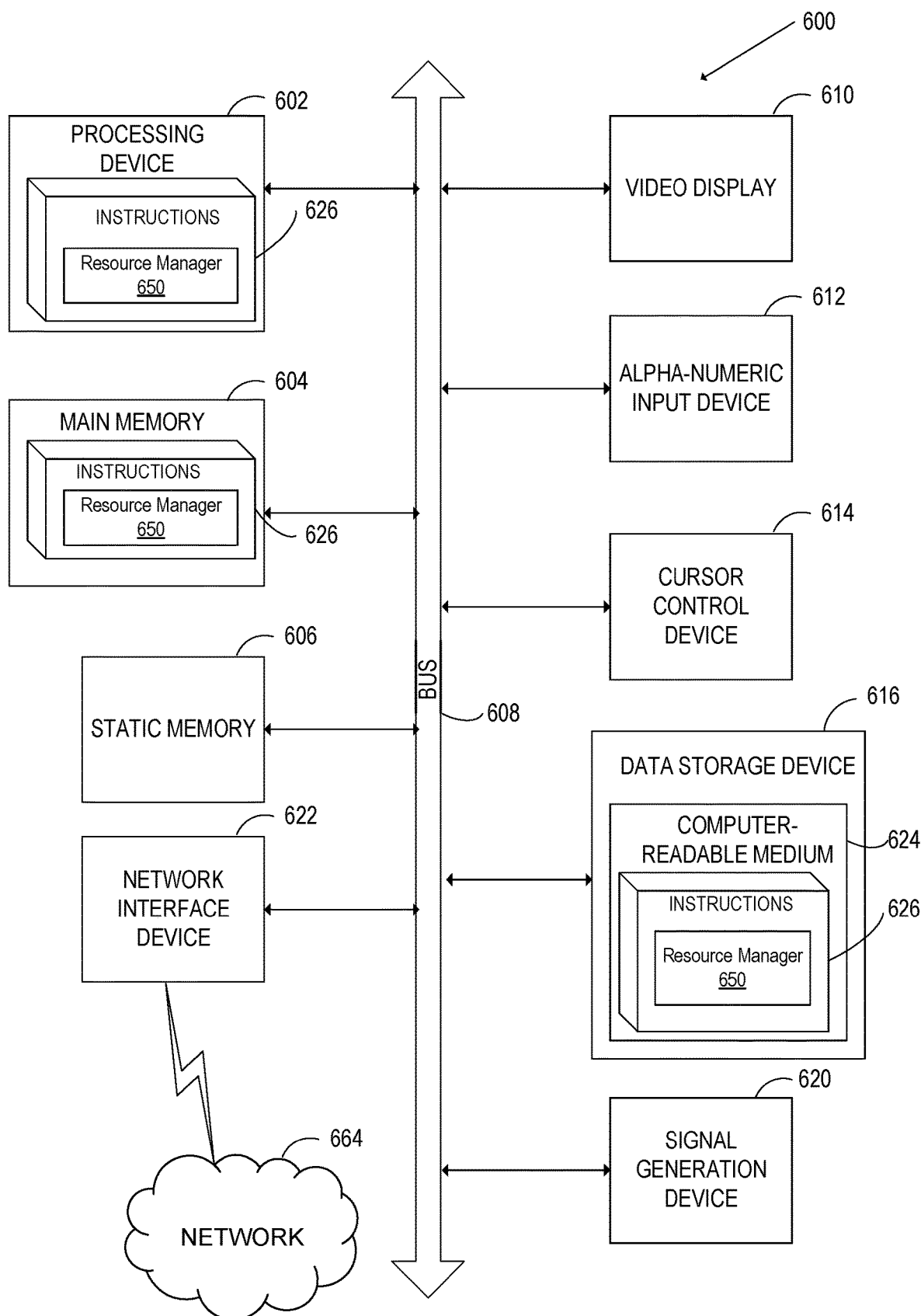
FIG. 6 depicts a block diagram of an illustrative computing device operating in accordance with the examples of the disclosure.

FIG. 6 depicts a block diagram of a computer system operating in accordance with one or more aspects of the disclosure. In various illustrative examples, computer system 600 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 400 for resource manager 650 (which may implement the functions of resource manager 190 of FIG. 1 and/or resource manager 200 of FIG. 2) and the modules illustrated in FIGS. 1, and 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "verifying," "evicting," "selecting," "restricting," "receiving," "updating," "providing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation. Furthermore, "requestor" and "initiator" are used interchangeably throughout this disclosure.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and 400 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the disclosure is not limited to the examples and implementations described. The scope of the disclosure should be determined with reference to the following claims, along with the full scope of equivalents to which the claims are entitled.

What is claimed is:

1. A method comprising:
receiving, by a processing device, a request to provision a set of computing resources of a cloud computing environment;
translating the request into a set of hardware specifications;
determining whether the set of hardware specifications is within a quota associated with an initiator of the request;
determining whether the cloud computing environment has available computing resources matching the set of hardware specifications; and
responsive to receiving the request and prior to fulfilling the request, sending a notification to the initiator of the request, wherein the notification comprises a first indication of whether the cloud computing environment has available computing resources matching the set of hardware specifications and a second indication of whether the set of hardware specifications is within the quota associated with the initiator of the request, wherein the quota represents a maximum amount of the available computing resources utilized by the initiator of the request.

2. The method of claim 1, wherein the computing resources comprise at least one of: a compute resource or a network configuration.

3. The method of claim 1, wherein the hardware specifications comprise at least one of: an amount of disk space, an amount of memory, a number of central processing units (CPU)s, or a network identifier.

4. The method of claim 1, wherein translating the request into a set of hardware specifications further comprises:
determining, by parsing the request, at least one of: a storage size, a memory size, a central processing unit (CPU) type identifier, or a network identifier to be consumed by a computing resource of the set of computing resources consumes.

5. The method of claim 1, further comprising:
aggregating, in view of the set of hardware specifications, available computing resources from two or more hosts in the cloud computing environment, wherein the available computing resources comprise at least one of an available disk space, an available memory, an available central processing unit, or an available network.

6. The method of claim 1, wherein determining whether the cloud computing environment has available computing resources matching the set of hardware specifications further comprises:
determining that a host of the cloud computing environment has available memory and available central processing units (CPUs) matching the set of hardware specifications.

7. The method of claim 1, wherein determining whether the cloud computing environment has available computing resources matching the set of hardware specifications further comprises:
determining that the cloud computing environment has available disk space within a storage domain matching the set of hardware specifications; and
determining that the cloud computing environment has available networks matching the set of hardware specifications.

8. The method of claim 1, further comprising:
causing the request to be executed; and
notifying the initiator of the request of execution of the request.

9. A system comprising:
a memory; and
a processing device communicably coupled to the memory to:
receive a request to provision a set of computing resources of a cloud computing environment;
translate the request into a set of hardware specifications;
determine whether the set of hardware specifications is within a quota associated with an initiator of the request;
determine whether the cloud computing environment has available computing resources matching the set of hardware specifications; and
responsive to receiving the request and prior to fulfilling the request, send a notification to the initiator of the request, wherein the notification comprises a first indication of whether the cloud computing environment has available computing resources matching the set of hardware specifications and a second indication of whether the set of hardware specification is within the quota associated with the initiator of the request, wherein the quota represents a maximum amount of the available computing resources utilized by the initiator of the request.

10. The system of claim 9, wherein the computing resources comprise at least one of: a compute resource or a network configuration.

11. The system of claim 9, wherein the hardware specifications comprise at least one of: an amount of disk space, an amount of memory, a number of central processing units (CPU)s, or a network identifier.

12. The system of claim 9, wherein the processing device to translate the request into a set of hardware specifications further comprises the processing device to:
determine, by parsing the request, at least one of: a storage size, a memory size, a central processing unit (CPU) type identifier, or a network identifier to be consumed by a computing resource of the set of computing resources consumes.

13. The system of claim 9, wherein the processing device is further to:
aggregate, in view of the set of hardware specifications, available computing resources from two or more hosts in the cloud computing environment, wherein the available computing resources comprise at least one of an available disk space, an available memory, an available central processing unit, or an available network.

14. The system of claim 9, wherein the processing device to determine whether the cloud computing environment has available computing resources matching the set of hardware specifications further comprises the processing device to:
determine that a host of the cloud computing environment has available memory and available central processing units (CPUs) matching the set of hardware specifications.

15. The system of claim 9, wherein the processing device to determine whether the cloud computing environment has available computing resources matching the set of hardware specifications further comprises the processing device to:
determine that the cloud computing environment has available disk space within a storage domain matching the set of hardware specifications; and
determine that the cloud computing environment has available networks matching the set of hardware specifications.

16. The system of claim 9, wherein the processing device is further to:
cause the request to be executed; and
notify the initiator of the request of execution of the request.

17. A non-transitory machine-readable storage medium storing instructions that cause a processing device to:
receive a request to provision a set of computing resources of a cloud computing environment;
translate the request into a set of hardware specifications;
determine whether the set of hardware specifications is within a quota associated with an initiator of the request;
determine whether the cloud computing environment has available computing resources matching the set of hardware specifications; and
responsive to receiving the request and prior to fulfilling the request, send a notification to the initiator of the request, wherein the notification comprises a first indication of whether the cloud computing environment has available computing resources matching the set of hardware specifications and a second indication of whether the set of hardware specifications is within the quota associated with the initiator of the request, wherein the quota represents a maximum amount of the available computing resources utilized by the initiator of the request.

18. The non-transitory machine-readable storage medium of claim 17, wherein the computing resources comprise at least one of: a compute resource or a network configuration.

19. The non-transitory machine-readable storage medium of claim 17, wherein the hardware specifications comprise at least one of: an amount of disk space, an amount of memory, a number of central processing units (CPU)s, or a network identifier.

20. The non-transitory machine-readable storage medium of claim 17, wherein the processing device to translate the request into a set of hardware specifications further comprises the processing device to:
   determine, by parsing the request, at least one of: a storage size, a memory size, a central processing unit (CPU) type identifier, or a network identifier to be consumed by a computing resource of the set of computing resources consumes.

21. The non-transitory machine-readable storage medium of claim 17, wherein the processing device is further to:
   Aggregate, in view of the set of hardware specifications, available computing resources from two or more hosts in the cloud computing environment, wherein the available computing resources comprise at least one of an available disk space, an available memory, an available central processing unit, or an available network.

22. The non-transitory machine-readable storage medium of claim 17, wherein the processing device to determine whether the cloud computing environment has available computing resources matching the set of hardware specifications further comprises the processing device to:
   determine that a host of the cloud computing environment has available memory and available central processing units (CPUs) matching the set of hardware specifications.

23. The non-transitory machine-readable storage medium of claim 17, wherein the processing device to determine whether the cloud computing environment has available computing resources matching the set of hardware specifications further comprises the processing device to:
   determine that the cloud computing environment has available disk space within a storage domain matching the set of hardware specifications; and
   determine that the cloud computing environment has available networks matching the set of hardware specifications.

24. The non-transitory machine-readable storage medium of claim 17, wherein the processing device is further to:
   cause the request to be executed; and
   notify the initiator of the request of execution of the request.

* * * * *